United States Patent [19]

Bainard

[11] 4,114,245
[45] Sep. 19, 1978

[54] PRESSURE SHAFT SEAL METHOD

[75] Inventor: Dean R. Bainard, Clover, S.C.

[73] Assignee: Garlock Inc., Rochester, N.Y.

[21] Appl. No.: 752,724

[22] Filed: Dec. 21, 1976

Related U.S. Application Data

[62] Division of Ser. No. 622,876, Oct. 16, 1975, abandoned.

[51] Int. Cl.² .................. B23P 15/00; B29G 1/00
[52] U.S. Cl. .................. 29/156.4 R; 29/527.1; 264/135; 264/268
[58] Field of Search .............. 29/156.4 R, 527.1; 277/37, 153, 35, 138, 164, 165, 181; 264/268, 274, 135

[56] References Cited

U.S. PATENT DOCUMENTS

| 3,246,369 | 4/1966 | Rhoads et al. | 425/128 |
|---|---|---|---|
| 3,666,852 | 5/1972 | Burke | 29/527.1 |
| 3,743,305 | 7/1973 | Berens et al. | 277/37 |
| 3,767,739 | 10/1973 | Smith | 264/268 |
| 3,851,037 | 11/1974 | Day et al. | 264/268 |
| 3,871,669 | 3/1975 | Repella | 277/182 |
| 3,913,924 | 10/1975 | Barefoot et al. | 277/37 |

FOREIGN PATENT DOCUMENTS

| 17,653 | 8/1967 | Japan | 29/527.1 |
|---|---|---|---|
| 23,083 | 5/1967 | Japan | 29/527.1 |
| 23,682 | 5/1967 | Japan | 29/527.1 |

Primary Examiner—C.W. Lanham
Assistant Examiner—Daniel C. Crane
Attorney, Agent, or Firm—Schovee and Boston

[57] ABSTRACT

In the art of pressure shaft seals, a method for sealing including installing a seal having a reinforcing shell with a cylindrical portion and a radial portion wherein the pierce or endwall of the radial flange is formed as a radius or taper facing axially inwardly, instead of as a cylindrical surface parallel to the seal axis, to reduce the shear pressure on the bond at the pierce and also to eliminate a sharp corner and any tendency of the rubber to tear, and wherein an offset is provided on the axially outer surface of the radial flange of the metal case adjacent the pierce to disturb the flowing rubber from wiping the bonding cement off of the pierce.

6 Claims, 3 Drawing Figures

4,114,245

PRESSURE SHAFT SEAL METHOD

CROSS REFERENCE TO RELATED APPLICATION

This is a divisional of application serial number 622,876, filed Oct. 16, 1975, now abandoned.

BACKGROUND OF THE INVENTION

1. Field of the Invention

This invention relates to the art of pressure shaft seals in particular to a method for sealing and a method for reducing bond breakage and increasing reliability in pressure shaft seals.

2. Description of the Prior Art

A common mode of failure of pressure seals is bond breakage at the pierce or hole cut in the radial flange of the reinforcing metal case or shell bonded to the elastomeric sealing member.

It is an object of the present invention to greatly reduce the possibility of bond breakage at the pierce and to therefore improve the reliability of pressure shaft seals and to provide improved pressure sealing methods whereby seals can operate under greater pressures with slight modification and expense.

It is a further object of the present invention to provide a shaft seal and a method for reducing bond breakage in pressure shaft seals by providing an offset on the axially outer surface of the radial flange at the radially inner end thereof to prevent rubber flow during molding from wiping the bonding cement off of the pierce or endwall of the radial flange and to provide the pierce or endwall of the radial flange as a non-cylindrical radius or taper facing axially inwardly to reduce the shear pressure exerted on the bond at the endwall.

SUMMARY OF THE PRESENT INVENTION

An improved pressure shaft seal and method for reducing bond breakage in pressure shaft seals of the type including a reinforcing shell having a radial flange and an elastomeric sealing member supported by the radial flange with the sealing member including portions bonded to both axially inner and outer sidewalls of the flange and to the endwall of the radial flange. The improvements comprise providing an axially outwardly extending offset on the outer sidewall adjacent the endwall of the radial flange to prevent the flow of elastomer during molding from wiping the bonding cement off of the endwall, and also the endwall of the radial flange being a radius or taper facing axially inwardly to reduce the shear pressure on the bond at the endwall.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
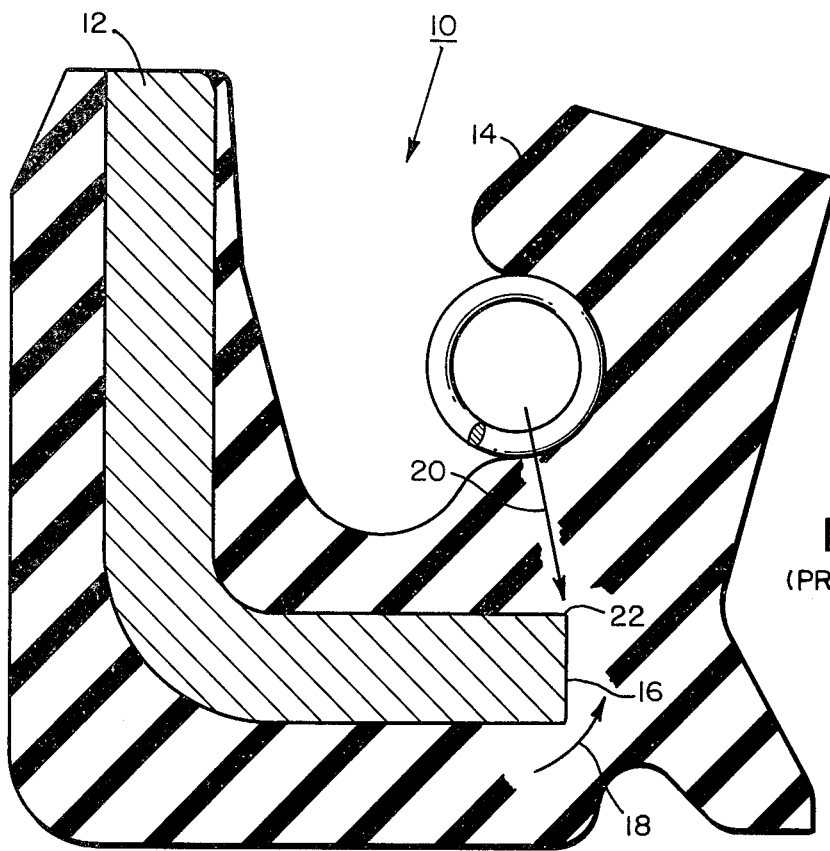
FIG. 1 is a partial, cross-sectional view through a prior art pressure shaft seal.

With reference now to the drawings, FIG. 1 shows a known prior art pressure shaft seal 10 comprising a metal reinforcing case or shell 12 bonded to an elastomeric sealing member 14. The most common mode of failure of a pressure seal 10 as shown in FIG. 1 is bond breakage at the pierce, hole cut, or endwall 16 of the metal case 12. It has been found that three cooperating causes of bond failure at the endwall 16 are: (1) that rubber flow (indicated by an arrow 18 in FIG. 1) during molding is such that the rubber flow tends to wipe the bonding cement off of the endwall 16, (2) the pressure during operation of the seal 10 (indicated by an arrow 20 in FIG. 1) puts the bond at the endwall 16 under shear, and (3) the pressure (see arrow 20) during operation of the seal 10 is directed at a sharp corner 22.

Figure 2:
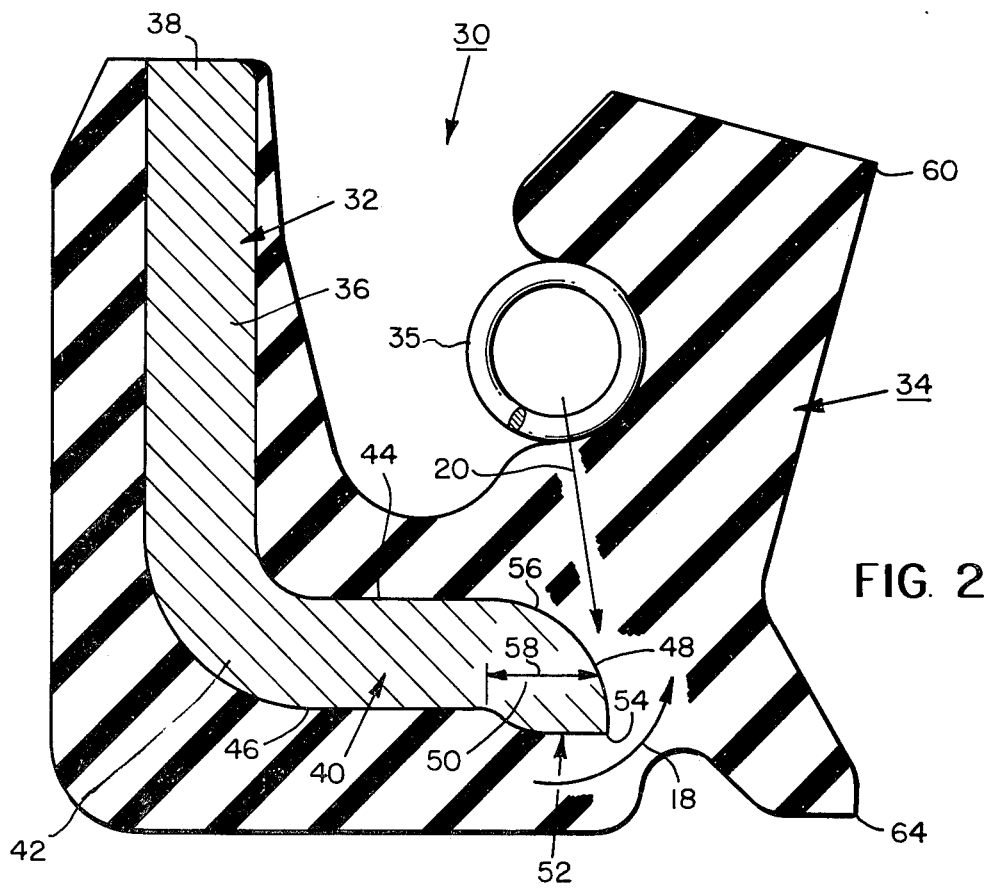
FIG. 2 is a partial, cross-sectional view through a pressure shaft seal according to the present invention.

Referring now to the present invention, FIG. 2 shows a pressure shaft seal 30 in which the above-mentioned problems in the prior art are eliminated or greatly reduced by the below described offset and tapering endwall. The shaft seal 30 includes a reinforcing shell 32, preferably of metal, an elastomeric sealing member 34 bonded to the metal shell 32, and a greater spring 35. The shell 32 includes a cylindrical portion 36 having a free end 38 and a radially inwardly extending flange 40 at the other end 42 of the cylindrical portion 36. The radial flange 40 has an axially inner sidewall 44, an axially outer sidewall 46 and a radially inner endwall 48. The seal 30 used in the present invention is of the type in which the elastomeric sealing member 34 includes portions bonded to the axially inner sidewall 44, the axially outer sidewall 46 and to the radially inner endwall 48 of the shell 32.

According to the present invention, an offset 52 is provided on the outer sidewall 46 adjacent the endwall 48. The offset 52 preferably extends out away from the outer sidewall 46 a distance of from about 0.005 to 0.0015 inch although it can extend out a greater distance. The distance is preferably less than the thickness of the shell 32. The offset 52 is preferably of the shape shown in FIG. 2 and has a radial width (indicated by the arrow 58) of between about 0.010 to 0.075 inch, and preferably of about 0.040 inch. The specific size and shape of the offset 52 is not critical, as long as it has such a shape and size to disturb the flow of rubber (indicated by arrow 18) to prevent the tendency of the rubber to wipe the bonding cement off of the surface 48. It appears that the offset 52 causes this result because the flow is not at as high a velocity as previously and also because the offset 52 causes a swirling action, perhaps similar to eddy currents, which results in reducing the tendency of the flow to wipe the bonding cement off of the end wall 48. While the seal 30 can be molded by any one of compression, transfer or injection molding, the offset 52 is of primary importance with respect to compression molding wherein the shell 32 is placed in the mold up-side-down from the position shown in FIG. 2 with a rubber prep placed on top of the radial flange 40 such that the rubber flow during molding around the end wall 48 is as shown by the arrow 18. The offset 52 is useful in both injection and transfer molding, however, it is not as critical in such cases as it is with respect to compression molding as described above. While the offset 52 is useful alone, in providing the above-mentioned advantage, it is preferred to use the offset 52 in combination with the below described radius or taper of the endwall 48.

A second aspect of the present invention is the fact that the endwall 48 is formed with a radius or taper so that the endwall faces radially inwardly, as contrasted to the flat cylindrical surface 16 of the prior art which is parallel to the seal axis. One preferred shape for the surface 48 is shown in FIG. 2. The endwall 48 extends from an outer end 54 thereof to an inner end 56; preferably the entire surface of the endwall 48 is tapered, although it can be an increasing taper (from parallel to the seal axis to transverse thereto) as shown in FIG. 2. The preferred shape for the endwall 48 is a segment of approximately a circle having a radius approximately equal to the thickness of the shell 32.

The endwall 48 is preferably a smooth curve although it can be a series of small straight sections forming a tapering surface. While the entire surface is preferably tapered, it is of primary importance that the axially inner segment thereof be tapered and preferably a major portion (over 50%) of the endwall 48 is tapered or formed as a radius. The angle of the surface of the endwall 48 to the seal axis is preferably at least about 15°. By forming the surface 48 as a radius, this also provides the advantage during operation that pressure is directed against a radius instead of against a sharp corner as in the prior art, thus eliminating the tendency of the rubber to tear at the sharp corner.

As can be seen from the arrow 20 (indicating the pressure during operation) a given pressure exerts a much smaller shear force against the bond on the curved surface 48 than it does in the prior art wherein substantially all of the pressure is directed as a shear force against the bond at the end wall 16 (see FIG. 1). While the prior art pressure seal of FIG. 1 could operate, for example, in a range of 500–800 psi, by making the two modifications of the present invention to the seal of FIG. 1 resulting in the seal of the present invention shown in FIG. 2, the seal 30 can operate up to about 1500 psi. Similarly, other pressure seals designed to operate in other pressure ranges (and in fact other seals that are not even pressure seals), if modified according to the present invention to provide the tapering endwall 48 and the offset 52 can operate at much higher pressures than they could previously.

The offset and the tapering or curving endwall 48 can be formed in any desired manner, however, they are preferably simply formed in the die operation used in forming the shell 32 in its desired shape.

The elastomeric sealing member 34 preferably has a sealing lip 60 and a garter spring 35 which cooperate together as is well known in the art.

Figure 3:
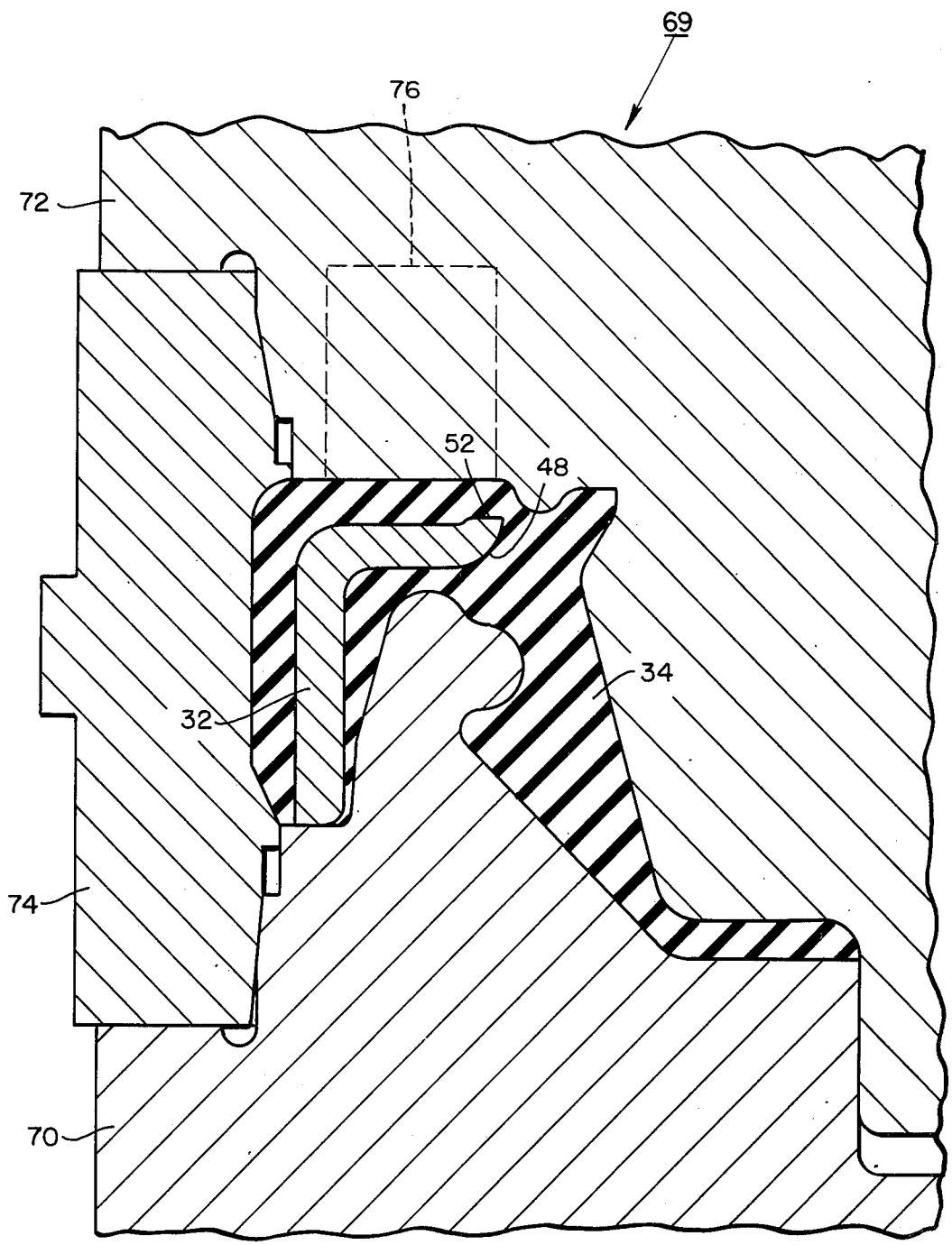
FIG. 3 is a partial, cross-sectional view through a mold for forming a seal according to the present invention.

FIG. 3 shows a mold 69 which can be used to form the seal 30 shown in FIG. 2. The mold includes a lower ring 70, an upper ring 72 and a central ring 74. The shell 32 is placed in the mold as shown in FIG. 3 and a rubber prep is placed in the area above the shell 32 indicated by the dotted lines 76, whereby when the mold is closed, the rubber flows over the offset 52 and toward the endwall 48 as indicated by the arrow 18 in FIG. 2.

The invention has been described in detail with particular reference to the preferred embodiments thereof, but it will be understood that variations and modifications can be effected within the spirit and scope of the invention as described hereinabove and as defined in the appended claims. For example, the seal 30 can have an O.D. sealing lip rather than an I.D. sealing lip 60 as shown in FIG. 2 in which case the tapered or radiused surface 48 does not taper outwardly from the axially outer wall to the axially inner wall but tapers radially inwardly from the axially outer wall to the axially inner wall of the radial flange. The important aspect is that the tapering endwall 48 faces axially inwardly toward the pressure of the application.

I claim:

1. A method for reducing bonding cement bond breakage in pressure shaft seals of the type including a reinforcing shell having a cylindrical portion and a radially inwardly extending flange and an elastomeric sealing member supported by the radial flange and including portions of elastomer of said member bonded by bonding cement to both axially inner and outer sidewalls and to an endwall of the radial flange, comprising steps of forming an axially extending offset on the outer sidewall of said radial flange adjacent the endwall thereof, said offset having a size and shape effective to disturb the flow of elastomer at said endwall, and molding said elastomeric member onto said reinforcing shell such that the elastomer flows axially inwardly over said offset and then toward said endwall such that said flow tends not to wipe said bonding cement off of said endwall during said molding step.

2. The method according to claim 1 comprising forming said offset to extend between about 0.005 to 0.015 inch out from the axially outer sidewall and with a radial width of from about 0.015 to 0.075 inch.

3. A method according to claim 1 comprising the step of forming at least a major portion of said endwall with a taper facing axially inwardly and extending from adjacent on axially outer end thereof to an axially inner end thereof, said taper forming an angle of at least 15° to the seal axis.

4. A method for making an improved pressure shaft seal of the type including a reinforcing shell having a cylindrical portion and a radially inwardly extending flange having axially inner and outer sidewalls and an endwall and an elastomeric sealing member supported by the radial flange and including portions of elastomer of said member bonded by bonding cement to said sidewalls and to said endwall of the radial flange, comprising the following steps:

forming an axially extending offset on the outer sidewall of said radial flange adjacent said endwall, forming at least a major portion of said endwall with a taper facing axially inwardly and extending from adjacent said offset to the axially inner end of said inner sidewall, said taper forming an angle of at least 15° with respect to the seal axis, placing said shell in a compression mold, said shell including said bonding cement on said inner and outer sidewalls and on said endwall, placing said elastomer for forming said elastomeric sealing member adjacent the surface of said outer sidewall in said mold, compressing and molding said elastomer to cause portions thereof to flow along said outer sidewall and over said offset toward and around said endwall such that said flow of elastomer tends not to wipe said bonding cement off of said endwall, and completing said compressing and molding to form said improved shaft seal.

5. The method according to claim 4 comprising forming said major portion of said endwall as a smooth, continuous curve.

6. The method according to claim 5 comprising forming said curve as approximately a segment of a circle having a radius approximately equal to the thickness of said shell.

* * * * *